United States Patent [19]

Hammarlund et al.

[11] Patent Number: 4,516,639
[45] Date of Patent: May 14, 1985

[54] POWERED LANDSCAPE RAKE

[76] Inventors: Kenneth Hammarlund, 226 Ratikas Rd.; Wilford Hammarlund, 57 Riverside Rd. West, both of Esko, Minn. 55733

[21] Appl. No.: 479,606

[22] Filed: Mar. 28, 1983

[51] Int. Cl.³ .................. A01B 33/02; A01B 65/02
[52] U.S. Cl. .................. 172/99; 172/122; 172/305; 172/501; 172/742
[58] Field of Search ........... 172/121, 122, 125, 297, 172/303, 305, 445.2, 477, 501, 554, 667, 673, 742, 791, 792, 793, 794, 795, 796, 797, 99, 537, 447; 404/122, 124; 299/39, 40

[56] References Cited

U.S. PATENT DOCUMENTS

| | | | |
|---|---|---|---|
| 2,197,549 | 4/1940 | Hargrave et al. | 299/39 X |
| 2,243,251 | 5/1941 | Gustafson | 404/122 |
| 2,434,818 | 1/1948 | Taylor | 172/445.2 |
| 3,055,439 | 9/1962 | Savage | 172/99 |
| 3,071,197 | 1/1963 | Larson | 172/99 |
| 3,117,631 | 1/1964 | Fahrenholz | 172/537 X |
| 3,138,883 | 6/1964 | Elenburg | 172/794 X |
| 3,181,619 | 5/1965 | Smith et al. | 172/99 |
| 3,197,188 | 7/1965 | Moore | 172/794 X |
| 3,517,749 | 6/1970 | Callahan | 172/501 X |
| 3,740,099 | 6/1973 | Lenzner | 299/39 |
| 3,767,262 | 10/1973 | Pentith | 172/122 X |
| 3,863,722 | 2/1975 | Hanser et al. | 172/305 X |
| 4,020,908 | 5/1977 | Kobayasi et al. | 172/742 X |
| 4,074,766 | 2/1978 | Orthman | 172/501 X |
| 4,161,987 | 7/1979 | Tolmer | 172/796 X |
| 4,304,307 | 12/1981 | Anderson | 172/796 X |
| 4,396,068 | 8/1983 | Handy | 172/125 X |

FOREIGN PATENT DOCUMENTS

| | | | |
|---|---|---|---|
| 251622 | 5/1964 | Australia | 172/794 |
| 1304941 | 8/1962 | France | 172/445.2 |

*Primary Examiner*—Richard T. Stouffer
*Attorney, Agent, or Firm*—Peterson, Wicks, Nemer & Kamrath

[57] ABSTRACT

A powered landscape rake for fine grading of and for stone and debris removal from a landscape surface is shown according to the teachings of the present invention. The rake of the present invention includes a drum rotatably mounted in a drum frame. The drum frame is mounted to a turntable assembly for allowing the drum frame to pivot about an axis generally perpendicular to the drum frame and which is located generally midway of the drum frame. A frame member is attached to the turntable and extends to a point under the tractor frame in front of the front wheels. The free end of the frame member is mounted for pivoting and swiveling to a frame attachment member. First and second cylinders are further attached to the turntable for positioning the drum frame at any desired angle in a vertical plane to the landscape and allow the drum frame to sway in a horizontal plane about the front frame attachment point. The drum can be rotated in either direction by a hydraulic motor for providing a kicking type action to the soil of the landscape surface for providing a smooth, fine, finished grade and for seeding and covering seed on the landscape surface.

13 Claims, 6 Drawing Figures

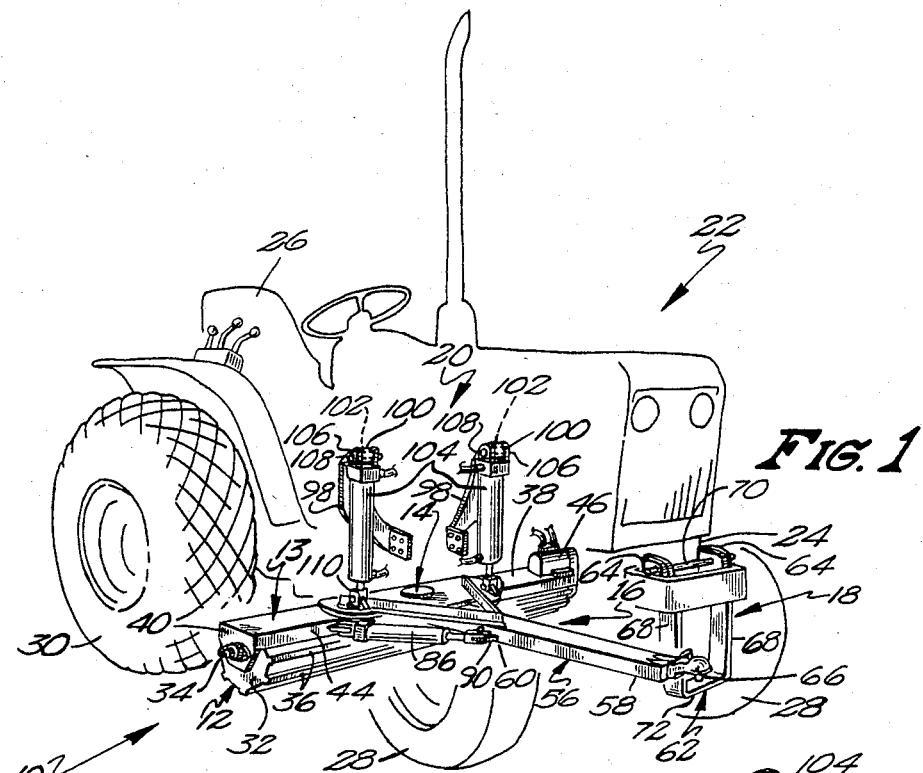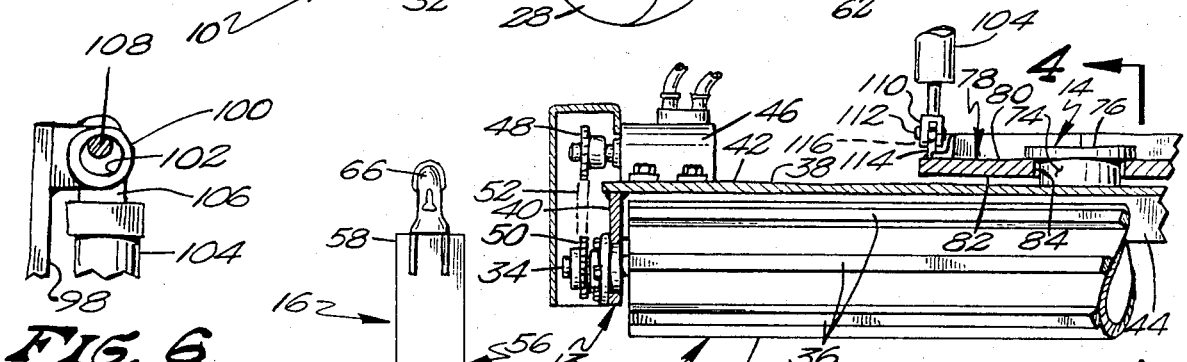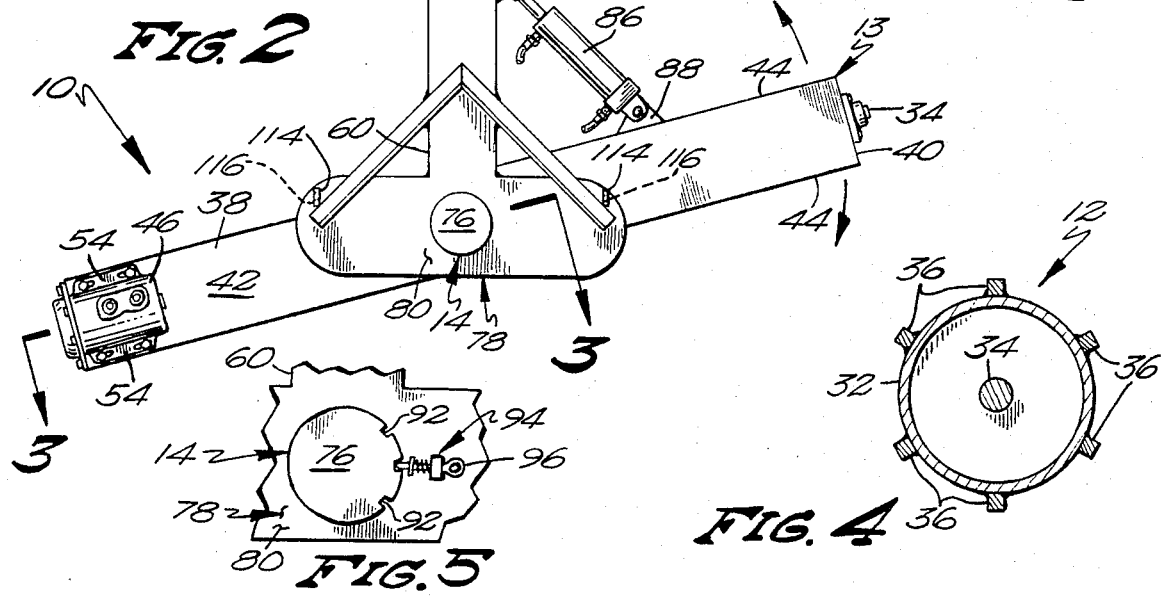

POWERED LANDSCAPE RAKE

BACKGROUND

The present invention relates generally to a powered landscape rake and more specifically to a powered landscape rake for fine grading and for stone and debris removal from a landscape surface.

It is most important that the ground be smooth and free of rocks, sticks, and other debris before sod or seed can be applied to a landscape surface. Prior to the present invention, the landscape surface was prepared by hand raking and shoveling the landscape surface, a slow, costly, and painstaking task, Attempts at the use of mechanization have failed or have been only partially effective. For example, blades were dragged on the landscape surface; however, rocks, soil clods, or other debris pulled under the blade leaving an uneven grade which had to be hand raked to a smooth surface. Likewise, rock windrowers have been utilized; however, these windrowers were ineffective especially in close quarters such as between existing houses because of their large, clumsy size, their inability to be quickly and rapidly adjusted, their pull type structure, their inability to be operated adjacent obstacles and structures, their inability to be operated adjacent sidewalks, and like disadvantages. Thus, even where rock windrowers were usable, substantial hand labor was additionally required.

SUMMARY

The powered landscape rake of the present invention solves these and other problems in the preparation of a landscape surface by providing a drum including members for providing a kicking type action to the landscape surface when the drum is rotated and engages the landscape surface. The drum is rotatably mounted and rotates within a drum frame. The drum frame is pivoted about an axis generally perpendicular to the drum frame by a turntable assembly. The turntable assembly is attached to the tractor frame at a point adjacent the front wheels for allowing the turntable to be swiveled about the point and to pivot about a vertical axis. The turntable assembly is further attached to the tractor frame at a point adjacent the rear wheels for allowing the raising and lowering of the turntable assembly for adjusting the drum frame in a vertical plane to be spaced from the landscape surface and to engage the landscape surface at the desired angle. The raising and lowering member also allows the turntable to sway in a horizontal plane.

It is thus an object of the present invention to provide a novel powered landscape rake.

It is further an object of the present invention to provide such a novel powered landscape rake which is mounted directly to a tractor rather than pulled thereby.

It is further an object of the present invention to provide such a novel powered landscape rake which can be easily, rapidly, and efficiently controlled by the operator.

It is further an object of the present invention to provide such a novel powered landscape rake which grades the landscape surface by a tumbling or kicking action rather than by a dragging or other type of action.

It is further an object of the present invention to provide such a novel powered landscape rake which is of a compact design.

It is further an object of the present invention to provide such a novel powered landscape rake which can be operated in close proximity to buildings, sidewalks, trees, or other obstructions.

It is further an object of the present invention to provide such a novel powered landscape rake which can be easily and rapidly attached and removed from a standard tractor.

It is further an object of the present invention to provide such a novel powered landscape rake which can be easily transported.

It is further an object of the present invention to provide such a novel powered landscape rake which includes a rotating drum which can be rotated in either direction.

It is further an object of the present invention to provide such a novel powered landscape rake which is of a simple design utilizing standard, readily available material.

It is further an object of the present invention to provide such a novel powered landscape rake which includes a landscaping operational member which can be located in any desired angle in a horizontal and/or a vertical plane to the landscape surface.

These and further objects and advantages of the present invention will become clearer in light of the following detailed description of illustrative embodiments of this invention described in connection with the drawings.

DESCRIPTION OF THE DRAWINGS

The illustrative embodiments may best be described by reference to the accompanying drawings where:

FIG. 1 shows a perspective view of a powered landscape rake utilizing the teachings of the present invention mounted to a standard tractor.

FIG. 2 shows a top plan view of the powered landscape rake of FIG. 1.

FIG. 3 shows a partial cross sectional view of the powered landscape rake of FIG. 1 according to section line 3—3 of FIG. 2.

FIG. 4 shows a partial cross sectional view of the powered landscape rake of FIG. 1 according to section line 4—4 of FIG. 3.

FIG. 5 shows a partial, top plan view of an alternate embodiment of the powered landscape rake of FIG. 1.

FIG. 6 shows a partial cross sectional view of the power landscape rake of FIG. 1.

All figures are drawn for ease of explanation of the basic teachings of the present invention; the extensions of the figures with respect to number, position, relationship, and dimensions of the parts to form the preferred embodiments will be explained or will be obvious from the explanation set forth.

Where used in the various figures of the drawings, the same numerals designate the same or similar parts in the powered landscape rake. Furthermore, when the terms "top", "bottom", "first", "second", "end", and similar terms are used herein, it should be understood that these terms have reference only to the structures shown in the drawings as it would appear to a person viewing the drawings and are utilized only to facilitate describing the invention.

DESCRIPTION

A powered landscape rake according to the teachings of the present invention is generally shown in the figures and designated 10. Rake 10 generally includes in its most preferred form a revolving drum 12, a drum frame 13, a turntable assembly 14, a main frame 16, a front frame attachment member 18, and a rear frame lifting and attachment member 20. In its most preferred form, rake 10 is utilized with a standard tractor 22 having a frame 24, an operator location 26, front wheels 28, and rear wheels 30.

Drum 12 in the preferred embodiment includes a cylindrical member 32 operatively attached to at least shaft portions 34 which extend from the ends thereof. In its most preferred form, member 32 is a 6 inch pipe. Drum 12 further includes ribs or bars 36 located on the exterior of cylindrical member 32. In its most preferred form, ribs 36 are parallel to each other, are equally spaced from each other, and a total of 6 ribs are provided. However, ribs 36 of other types and constructions can be provided such as ribs 36 having a spiral type construction on cylindrical member 32.

Drum frame 13 includes a support member 38 having depending end portions 40. In its most preferred form, support member 38 has a U-shaped construction and is constructed of channel iron. Specifically, member 38 includes a top portion 42 and two depending legs 44 which extend from the opposite edges of top portion 42. End portions 40 are attached to the ends of portion 42 and legs 44 of support member 38, such as by welding. Drum 12 is rotatably supported to frame 13 by shaft 34 extending through end portions 40 including suitable bearing members.

Rake 10 further includes power members for rotating drum 12 about its axial axis defined by shaft 34 at least on one end and shown in its most preferred form as a hydraulic motor 46 having a drive sprocket 48, a sprocket 50 located on a shaft 34, and a drive chain 52. In its most preferred form, motor 46 is adjustably mounted by a bracket 54 mounted to the top surface of top portion 42 of frame 13. In its most preferred form, motor 46 can be rotated in either a clockwise or counterclockwise direction such that drum 12 can similarly be rotated in either direction.

Frame 16 includes a support member 56 having a first end 58 and a second end 60. In its most preferred form, support member 56 has a U-shaped construction and is constructed of channel iron.

Front frame attachment member 18 in the preferred embodiment includes a U-shaped subframe 62, tractor attachment ears 64, and a frame swivel attachment 66. Ears 64 are suitably attached to the front end of tractor 22, preferably in front of wheels 28. The free ends of the vertical legs 68 of subframe 62 are pivotally attached to ears 64 by a pivot pin 70 which defines a horizontal pivot axis. Swivel attachment 66 is located on the horizontal central portion 72 of subframe 62 and allows the swivel attachment of first end 58 of frame 16 to subframe 62 of attachment member 18. Specifically, swivel attachment 66 allows frame 16 to pivot about a vertical axis and/or about a horizontal axis generally at a point adjacent central portion 72 of subframe 62.

Turntable assembly 14 allows the pivotal mounting of drum 12 and drum frame 13 to the second end 60 of frame 16 about a generally vertical axis. In its most preferred form, frame 16 extends to a point generally under frame 24 of tractor 22 behind front wheels 28. Assembly 14 includes in its most preferred form a cylindrical member 74 having a first end attached to the top surface of top portion 42 of frame 13. A radially extending flange 76 is attached to the second end of cylindrical member 74 in a spaced, parallel relation to the top surface of top portion 42 of frame 13. Assembly 14 further includes in its most preferred form a pivot plate 78 having a top surface 80 and a bottom surface 82. An aperture 84 of a size approximately equal to but slightly larger than cylindrical member 74 is provided in plate 78. Thus, plate 78 can be positioned such that cylindrical member 74 is located in aperture 84, with plate 78 captured between flange 76 and the top surface of top portion 42 of frame 13. Thus, plate 78 can rotate relative to cylindrical member 74. In its most preferred form, second end 60 of frame 16 is attached to plate 78.

Rake 10 further includes members for rotating and locking turntable assembly 14 in the desired position. In the most preferred form as best seen in FIGS. 1 and 2, rake 10 includes a hydraulic cylinder 86 having a first end and a second end. The first end of cylinder 86 is operatively attached to drum frame 13 such as by an ear 88. The second end of cylinder 86 is operatively attached to frame 16 such as by an ear 90. Thus, turntable assembly 14, drum 12, and frame 13 operatively attached thereto can be rotated to and locked in the desired position by extending or retracting hydraulic cylinder 86.

In an alternate form as best seen in FIG. 5, rake 10 includes a series of notches 92 formed in flange 76 and s latch assembly 94 attached to top surface 80 of pivot plate 78. Latch assembly 94 includes a pin 96 which is spring biased into notches 92. Thus, when it is desired to rotate and lock turntable assembly 14, pin 96 is pulled out of notches 92 and drum 12 and frame 13 are rotated by the operator to the desired position. At that time, pin 96 can be released such that the spring of assembly 94 will push pin 96 into the selected notch 92 for locking turntable 14 in the desired position.

Rear frame lifting and attachment member 20 includes in its most preferred form upstanding legs 98 attached to frame 24 on opposite sides of tractor 22. In the preferred embodiment, legs 98 are located at a point generally in front of rear wheels 30. Legs 98 include pivot ears 100 having apertures 102 having a diameter and defining a horizontal pivot axis which is generally perpendicular to frame 24 of tractor 22.

Member 20 further includes first and second hydraulic cylinders 104 located on opposite sides of tractor 22. Cylinders 104 include upper ears 106 for receiving a pivot pin 108 and lower ears 110 for receiving a pivot pin 112 on opposite ends thereof. Pins 108 of first and second cylinders 104 have a diameter substantially less than and for receipt in apertures 102 of ears 100 of legs 98 as best seen in FIG. 6. Pivot ears 114 having apertures 116 having a diameter and defining a horizontal pivot axis which is generally perpendicular to frame 24 of tractor 22 are further provided on top surface 80 of plate 78. Pins 112 of first and second cylinders 104 have a diameter substantially less than and for receipt in apertures 116 of ears 114 of turntable assembly 14 in a similar manner as seen in FIG. 6 for pin 108 and aperture 102. In addition to the ability of pivoting about pins 108 and pins 112, cylinders 104 can swivel at its pivotal attachment to legs 98 and to turntable assembly 14 due to the oversized nature of apertures 102 and 116 of ears 100 and 114 as best seen in FIG. 6.

Suitable control valves for controlling hydraulic motor 46 and cylinders 86 and 104 are provided for access to the operator situated at the operator location 26. In the most preferred form of the present invention, the control valves are mounted together on the right fender of tractor 22 such that hydraulic motor 46 and cylinders 86 and 104 can be controlled by the right hand of the operator while steering of tractor 22 can be effected by the left hand of the operator.

Now that the construction of rake 10 according to the preferred embodiment of the present invention has been set forth, the operation and subtle features of the present invention can be set forth and appreciated.

First, due to the swivel or sway type mounting of frame 16 and turntable 14 to front and rear attachment members 18 and 20, drum 12 is not rigidly mounted to tractor 22, but is allowed to follow obstacles in the landscape surface, for example, to follow a sidewalk or the outer perimeter of a tree or building, thus eliminating the need of hand raking as was required in the prior art. Specifically, rake 10 can be positioned such that the end of frame 13 abuts with the obstacle and pushes rake 10 slightly out of its normal, central position. Due to the tendency of rake 10 to return to its normal, central position under tractor 22, drum 12 will follow the obstacle even though the perimeter of the obstacle varies, the distance of tractor 22 from the obstacle may vary, and/or the terrain of the landscape varies.

Furthermore, the swivel or sway type mounting allows drum 12 to be raised on either or both sides without binding to allow drum 12 to be positioned above the landscape surface and in any desired angle to the landscape surface in a vertical plane. Additionally, due to turntable assembly 14, drum 12 can be positioned in any desired angle with respect to the landscape surface in a generally horizontal plane. Therefore, the landscape surface can be graded by drum 12 of rake 10 to any desired degree, with any excess, rocks, and other debris being directed in any desired direction.

Additionally, due to the rotating nature of drum 12 and due to ribs 36, a tumbling or kicking action is placed on the soil, rocks, and other debris in the path of drum 12 on the landscape surface for producing an even, fine grade rather than an uneven grade as produced by dragging a blade over the landscape surface as was done in the prior art. Thus, no hand raking is required, and in fact, a more even and finer grade can be obtained than was previously obtained by hand raking. Similarly, due to the ability of drum 12 to be rotated in either direction, rake 10 can be utilized for providing a smooth, fine, "finished" grade with drum 12 rotating opposite to rotation of wheels 28 and 30 to provide a landscape surface suitable for seeding or sodding or rake 10 can be utilized for seeding and covering the seed on the "finished" grade of the landscape surface with drum 12 rotating in the same direction as wheels 28 and 30. Thus, rake 10 has multiple uses, many of which were previously performed by hand or which previously required many different types of equipment. Therefore, rake 10 allows considerably less manpower and less equipment to accomplish the same or better results than in the prior art.

Likewise, rake 10 is of a very compact design. Thus, the degree to which drum 12 can be angled with respect to the landscape surface is maximized and allows its placement under frame 24 between wheels 38 and 30 of a standard tractor 22. Similarly, by the use of quick couplers on the hydraulic hoses for hydraulic motor 46 and hydraulic cylinders 86 and 104, and due to the compact and light weight design, rake 10 can be easily attached or removed from tractor 22 allowing tractor 22 to be used for other purposes. Furthermore, rake 10 according to the teachings of the present invention can be easily transported either on tractor 22 or separate therefrom due to its compact design and ease of removal and replacement as discussed hereinbefore.

Now that the basic teachings of the present invention have been explained, many extensions and variations will be obvious to one having ordinary skill in the art. For example, although rake 10 according to the teachings of the present invention utilizes standard, readily available material such as channel iron, flat iron plate, and pipes, rake 10 according to the teachings of the present invention can be be manufactured utilizing generally manufactured or cast parts.

Thus, since the invention disclosed herein may be embodied in other specific forms without departing from the spirit or the general characteristics thereof, some of which forms have been indicated, the embodiments described herein are to be considered in all respects illustrative and not restrictive. The scope of the invention is indicated by the appended claims, rather than by the foregoing description, and all changes which comes within the meaning and range of equivalency of the claims are intended to be embraced therein.

What is claimed is:

1. Powered landscape rake for fine grading and for stone and debris removal from a landscape surface for mounting to a tractor having a frame, front wheels, and rear wheels comprising, in combination: a drum including a cylindrical member; axial extending elongated ribs formed on the cylindrical member for providing a kicking type action to be landscape surface when the cylinder member is rotated and engages the landscape surface; a drum frame including means for rotatably mounting the drum with respect to the drum frame; means for rotating the drum in the drum frame in either a clockwise or a counterclockwise direction; a turntable assembly for allowing the drum frame to pivot about an axis generally perpendicular to the drum frame and assembly midway of the drum frame, with the turntable assembly including a first member in a rotatable relation to a second member and means for rotating and locking the second member relative to the first member about the turntable pivot axis, with the first member of the turntable assembly being attached to the drum frame; a main frame member having a first end and a second end, with the second end of the main frame member being attached to the second member of the turntable assembly, with the first end of the main frame being adapted to extend to a point located generally below the frame of the tractor and in front of the front wheels of the tractor; a front frame attachment member for attachment to the frame of the tractor in front of the front wheels; wherein the front frame attachment member comprises, in combination: a U-shaped subframe having a central portion and upstanding vertical legs attached to the opposite ends of the central portion, tractor frame attachment members, and means for pivotally attaching the free ends of the vertical legs of the subframe to the tractor attachment members; means for attaching the first end of the main frame to the front frame attachment member for allowing swivelling of the main frame with respect to the front frame attachment member about a point located beneath the frame of the tractor and for allowing the turntable to pivot about a generally vertical axis; with the means for attaching the first end of the main frame to the front frame attachment member being positioned on the central portion of the U-shaped subframe; first and second hydraulic cylinders locatable on opposite sides of the tractor frme; means for attaching the upper ends of the hydraulic cylinders to the tractor frame for allowing pivotal and swivel movement of the hydraulic cylinders with respect to the tractor frame; and means for attaching the lower ends of the hydraulic cylinders to the second member of the turntable assembly allowing pivotal and swivel movement of the hydraulic cylinders with respect to the turntable assembly, with the hydraulic cylinder attaching means allowing the turntable assembly to sway in a horizontal plane locatable parallel to the landscape surface and in a direction generally perpendicular to the frame of the tractor, and with the hydraulic cylinders raising and lowering the drum frame in a generally vertical plane to be spaced from the landscape surface or to engage the landscape surface.

2. The powered landscape rake of claim 1 wherein the means for allowing pivotal and swivel movement of the hydraulic cylinders with respect to the tractor frame comprises, in combination: upstanding legs attached to and located on opposite sides of the tractor; ears formed on the free ends of the upstanding legs; ears formed on the upper ends of the hydraulic cylinders; pivot pins supported in one of the ears of the upstanding legs and the upper ends of the hydraulic cylinders, with the pivot pins having a diameter, with the ears of the other of the upstanding legs and the hydraulic cylinders having an aperture substantially greater than the diameter of the pivot pins and for receipt of the pivot pins.

3. The powered landscape rake of claim 1 wherein the means for allowing pivoting and swivel attachment of the turntable assembly with respect to the hydraulic cylinders comprises, in combination: ears attached to the second member of the turntable assembly; ears formed on the lower end of the hydraulic cylinders; pivot pins supported in one of the ears of the turntable assembly and the lower ends of the hydraulic cylinders, with the pivot pins having a diameter, with the ears of the other of the turntable assembly and the hydraulic cylinders having an aperture having a diameter substantially larger than the diameter of the pivot pins and for receiving the pivot pins.

4. The powered landscape rake of claim 1 wherein the turntable rotating and locking means comprises, in combination: a hydraulic cylinder having a first end operatively attached to the main frame member and a second end operatively attached to the drum frame.

5. The powered landscape rake of claim 1 wherein turntable assembly rotating and locking means comprises, in combination: notches formed in the first member; and a latching assembly located on the second member; with the latching assembly including a pin for selective removal and replacement within the notches of the first member of the turntable assembly.

6. The powered landscape rake of claim 1 wherein the means for rotating the drum in the drum frame includes a hydraulic motor, with the hydraulic motor being rotatable in either a clockwise or a counterclockwise direction.

7. Powered landscape rake for fine grading and for stone and debris removal from a landscape surface for mounting to a tractor having a frame, front wheels, and rear wheels comprising, in combination: a drum including a cylindrical member; means on the cylindrical member for providing a kicking type action to the landscape surface when the cylinder member is rotated and engages the landscape surface; a drum frame including means for rotatably mounting the drum with respect to the drum frame; means for rotating the drum in the drum frame; a turntable assembly for allowing the drum frame to pivot about an axis generally perpendicular to the drum frame, with the turntable assembly including a first member in a rotatable relation to a second member and means for rotating and locking the second member relative to the first member about the turntable pivot axis, with the first member of the turntable assembly being attached to the drum frame; means for attaching the second member of the turntable assembly to the frame adjacent to the front wheels of the tractor and for allowing the turntable assembly to swivel about a point located beneath the frame of the tractor and for allowing the turntable to pivot about a generally vertical axis; and means for attaching the second member of the turntable assembly to the tractor frame adjacent the rear wheels, for allowing the turntable assembly to sway in a horizontal plane parallel to the landscape surface and in a direction generally perpendicular to the frame of the tractor, and for raising and lowering the drum frame in a generally vertical plane to be spaced from the landscape surface or to engage the landscape surface at any desired angle, wherein the means for attaching the turntable assembly to the tractor frame adjacent to the front wheels comprises, in combination: a main frame member having a first end and a second end, with the second end of the main frame member being attached to the second member of the turntable assembly, with the first end of the main frame being adapted to extend to a point located generally below the frame of the tractor and in front of the front wheels of the tractor; a front frame attachment member for attachment to the frame of the tractor in front of the front wheels; and means for attaching the first end of the main frame to the front frame attachment member for allowing swivelling of the main frame with respect to the front frame attachment member; wherein the front frame attachment member comprises, in combination: a U-shaped subframe having a central portion and upstanding vertical legs attached to the opposite ends of the central portion, tractor frame attachment members, and means for pivotally attaching the free ends of the vertical legs of the subframe to the tractor attachment members; with the means for attaching the first end of the main frame to the front frame attachment member being positioned on the central portion of the U-shaped subframe.

8. Powered landscape rake for fine grading and for stone and debris removal from a landscape surface for mounting to a tractor having a frame, front wheels, and rear wheels comprising, in combination: a drum including a cylindrical member; means on the cylindrical member for providing a kicking type action to the landscape surface when the cylinder member is rotated and engages the landscape surface; a drum frame including means for rotatably mounting the drum with respect to the drum frame; means for rotating the drum in the drum frame; a turntable assembly for allowing the drum frame to pivot about an axis generally perpendicular to the drum frame, with the turntable assembly including a first member in a rotatable relation to a second member and means for rotating and locking the second member relative to the first member about the turntable pivot axis, with the first member of the turntable assembly being attached to the drum frame; means for attaching the second member of the turntable assembly to the frame adjacent to the front wheels of the tractor and for allowing the turntable assembly to swivel about a point located beneath the frame of the tractor and for allowing the turntable to pivot about a generally vertical axis; and means for attaching the second member of the turntable assembly to the tractor frame adjacent the rear wheels, for allowing the turntable assembly to sway in a horizontal plane parallel to the landscape surface and in a direction generally perpendicular to the frame of the tractor, and for raising and lowering the drum frame in a generally vertical plane to be spaced from the landscape surface or to engage the landscape surface at any desired angle, wherein the means for attaching the turntable assembly to the tractor frame adjacent the rear wheels comprises, in combination: first and second hydraulic cylinders locatable on opposite sides of the tractor frame; means for attaching the upper ends of the hydraulic cylinders to the tractor frame allowing pivotal and swivel movement of the cylinders with respect to the tractor frame; and means for attaching the lower ends of the hydraulic cylinders to the second member of the turntable assembly allowing pivotal and swivel movement of the hydraulic cylinders with respect to the turntable assembly; wherein the means for allowing pivotal and swivel movement of the hydraulic cylinders with respect to the tractor frame comprises, in combination: upstanding legs being adapted to be attached to and located on opposite sides of the tractor; ears formed on the free ends of the upstanding legs; ears formed on the upper ends of the hydraulic cylinders; pivot pins supported in one of the ears of the upstanding legs and the upper ends of the hydraulic cylinders, with the pivot pins having a diameter, with the ears of the other of the upstanding legs and the hydraulic cylinders having an aperture substantially greater than the diameter of the pivot pins and for receipt of the pivot pins.

9. The powered landscape rake of claim 8 wherein the turntable rotating and locking means comprises, in combination: a hydraulic cylinder having a first end operatively attached to the main frame member and a second end operatively attached to the drum frame.

10. The powered landscape rake of claim 8 wherein the turntable assembly rotating and locking means comprises, in combination: notches formed in the first member; and a latching assembly located on the second member; with the latching assembly including a pin for selective removal and replacement within the notches of the first member of the turntable assembly.

11. The powered landscape rake of claim 8 wherein the kicking action providing means comprising, in combination: elongated ribs extending axially on the outside surface of the cylindrical member.

12. The powered landscape rake of claim 8 wherein the means for rotating the drum in the drum frame includes a hydraulic motor, with the hydraulic motor being rotatable in either a clockwise or a counterclockwise direction.

13. Powered landscape rake for fine grading and for stone and debris removal from a landscape surface for mounting to a tractor having a frame, front wheels, and rear wheels comprising, in combination: a drum including a cylindrical member; means on the cylindrical member for providing a kicking type action to the landscape surface when the cylinder member is rotated and engages the landscape surface; a drum frame including means for rotatably mounting the drum with respect to the drum frame; means for rotating the drum in the drum frame; a turntable assembly for allowing the drum frame to pivot about an axis generally perpendicular to the drum frame, with the turntable assembly including a first member in a rotatable relation to a second member and means for rotating and locking the second member relative to the first member about the turntable pivot axis, with the first member of the turntable assembly being attached to the drum frame; means for attaching the second member of the turntable assembly to the frame adjacent to the front wheels of the tractor and for allowing the turntable assembly to swivel about a point located beneath the frame of the tractor and for allowing the turntable to pivot about a generally vertical axis; and means for attaching the second member of the turntable assembly to the tractor frame adjacent the rear wheels, for allowing the turntable assembly to sway in a horizontal plane parallel to the landscape surface and in a direction generally perpendicular to the frame of the tractor, and for raising and lowering the drum frame in a generally vertical plane to be spaced from the landscape surface or to engage the landscape surface at any desired angle, wherein the means for attaching the turntable assembly to the tractor frame adjacent the rear wheels comprises, in combination: first and second hydraulic cylinders locatable on opposite sides of the tractor frame; means for attaching the upper ends of the hydraulic cylinders to the tractor frame for allowing pivotal and swivel movement of the cylinders with respect to the tractor frame; and means for attaching the lower ends of the hydraulic cylinders to the second member of the turntable assembly allowing pivotal and swivel movement of the hydraulic cylinders with respect to the turntable assembly; wherein the means for allowing pivoting and swivel attachment of the turntable assembly to the hydraulic cylinders comprises, in combination: ears attached to the second member of the turntable assembly; ears formed on the lower ends of the hydraulic cylinders; pivot pins supported in one of the ears of the turntable assembly and the lower ends of the hydraulic cylinders, with the pivot pins having a diameter, with the ears of the other of the turntable assembly and the hydraulic cylinders having an aperture having a diameter substantially larger than the diameter of the pivot pins and for receiving the pivot pins.

* * * * *